(12) United States Patent
Yang

(10) Patent No.: US 10,281,888 B2
(45) Date of Patent: May 7, 2019

(54) ELECTRONIC DEVICE WITH SCREEN-CLEANING FUNCTION

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Cheng-Gang Yang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 108 days.

(21) Appl. No.: 15/216,711

(22) Filed: Jul. 22, 2016

(65) Prior Publication Data

US 2018/0027670 A1 Jan. 25, 2018

(30) Foreign Application Priority Data

Jul. 19, 2016 (CN) .......................... 2016 1 0568404

(51) Int. Cl.
| | |
|---|---|
| H05K 5/00 | (2006.01) |
| G05B 15/02 | (2006.01) |
| B08B 1/00 | (2006.01) |
| G06F 1/16 | (2006.01) |
| B08B 7/00 | (2006.01) |
| G01J 1/18 | (2006.01) |
| B08B 7/02 | (2006.01) |
| G02B 27/00 | (2006.01) |

(52) U.S. Cl.
CPC ............ *G05B 15/02* (2013.01); *B08B 7/0071* (2013.01); *B08B 7/02* (2013.01); *G01J 1/18* (2013.01); *G02B 27/0006* (2013.01); *G06F 1/1626* (2013.01); *G06F 1/1637* (2013.01); *G06F 1/1652* (2013.01); *G06F 1/1656* (2013.01)

(58) Field of Classification Search
CPC ... H05K 5/0017; G06F 1/1652; B08B 7/0071; B08B 7/02; G02B 27/0006; G05B 15/02; G01J 1/18

See application file for complete search history.

(56) References Cited

U.S. PATENT DOCUMENTS

| | | | |
|---|---|---|---|
| 9,849,648 B2 * | 12/2017 | Lee .......................... | B32B 3/30 |
| 2001/0043478 A1 * | 11/2001 | Yun ....................... | B08B 7/0057 |
| | | | 362/561 |
| 2014/0332417 A1 * | 11/2014 | Wicks ................... | H04B 1/3888 |
| | | | 206/37 |

(Continued)

*Primary Examiner* — Michael E Barr
*Assistant Examiner* — Benjamin L Osterhout
(74) *Attorney, Agent, or Firm* — ScienBiziP, P.C.

(57) ABSTRACT

An electronic device with automatic screen-cleaning function includes a film attached to a flexible display screen. The film includes heat-sensitive projections, light detection units, and heating circuit. Each light detection unit can detect a brightness value of light under the flexible display screen. The detected brightness value is evaluated against a predefined brightness value. When the detected brightness value does not equal the predefined brightness value, at least one electrical resistance heater element is controlled to generate heat, causing one of projections to bulge from the film. The bulging projection pushes out the flexible display screen, thus making dust or other external contaminant fall from the flexible display screen.

10 Claims, 5 Drawing Sheets

(56) References Cited

U.S. PATENT DOCUMENTS

2015/0169089 A1* 6/2015 Dixon .................. H04B 1/3888
  428/137
2016/0238750 A1* 8/2016 Hu ....................... G02B 5/0242

* cited by examiner

US 10,281,888 B2

ELECTRONIC DEVICE WITH SCREEN-CLEANING FUNCTION

CROSS-REFERENCE TO RELATED APPLICATIONS

This application claims priority to Chinese Patent Application No. 201610568404.X filed on Jul. 19, 2016, the contents of which are incorporated by reference herein.

FIELD

The subject matter herein generally relates to electronic devices, and more specifically, relates to an electronic device with screen-cleaning function.

BACKGROUND

Electronic devices with display screens such as mobile phones are ubiquitous. When the display screen is covered with dust for example, the dust not only blocks users from viewing content displayed on the display screen but also affects sensitivity of the display screens in response to user touches, thus affecting user experience.

BRIEF DESCRIPTION OF THE DRAWINGS

Implementations of the present disclosure will now be described, by way of example only, with reference to the attached figures.

DETAILED DESCRIPTION

Figure 1:
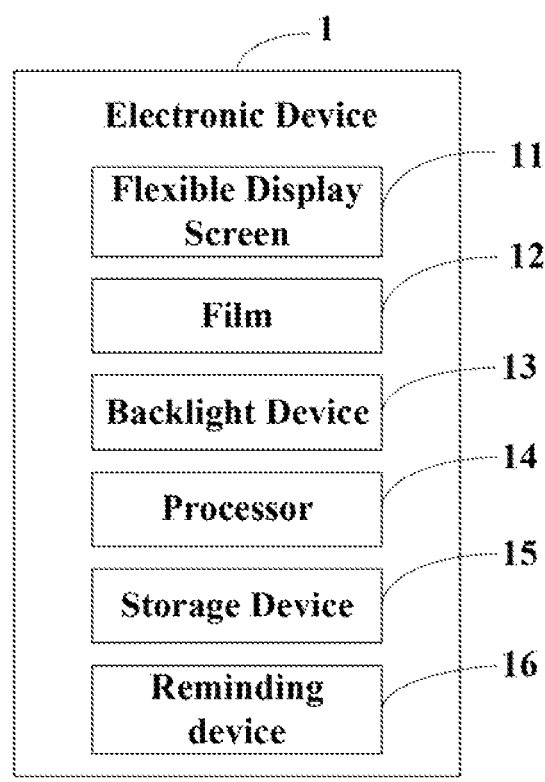
FIG. 1 is a block diagrammatic view of an electronic device in accordance with an embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features. The present disclosure, including the accompanying drawings, is illustrated by way of examples and not by way of limitation.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

Furthermore, the term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure relates to an electronic device. The electronic device includes a flexible display screen; a processor; and a film attached to the flexible display screen. The film includes a front surface and a back surface opposite to the front surface. The front surface faces the flexible display screen, and includes a plurality of heat-sensitive projections, and a plurality of light detection units. Each light detection unit can detect a brightness value of light under the flexible display screen and transmit a detected brightness value to the processor. The back surface is away from the flexible display screen, and includes a heating circuit. The heating circuit includes a plurality of electrical resistance heater elements. The processor can receive the detected brightness value and determine whether the detected brightness value equals a predefined brightness value. When the detected brightness value does not equal the predefined brightness value, an external contaminant is thus determined to exist and be located on the flexible display screen, the processor further controls at least one electrical resistance heater element to generate heat, thus causing one of the plurality of projections to bulge out from the front surface. Then, the bulging projection pushes out the flexible display screen, which makes the external contaminant fall from the flexible display screen.

FIG. 1 illustrates an electronic device according to an embodiment. The electronic device 1 includes a flexible display screen 11, a film 12, a backlight device 13, and a processor 14. In the embodiment, the electronic device 1 can be a tablet computer, a notebook computer, a smart phone, a personal digital assistant (PDA), or other suitable electronic device. The processor 14 can be a central processing unit (CPU), a microprocessor, or other data processor chip that performs computerized codes in the electronic device 1. FIG. 1 illustrates only one example of the electronic device; other examples can include more or fewer components than as illustrated, or have a different configuration of the various components in other embodiments.

Figure 2:
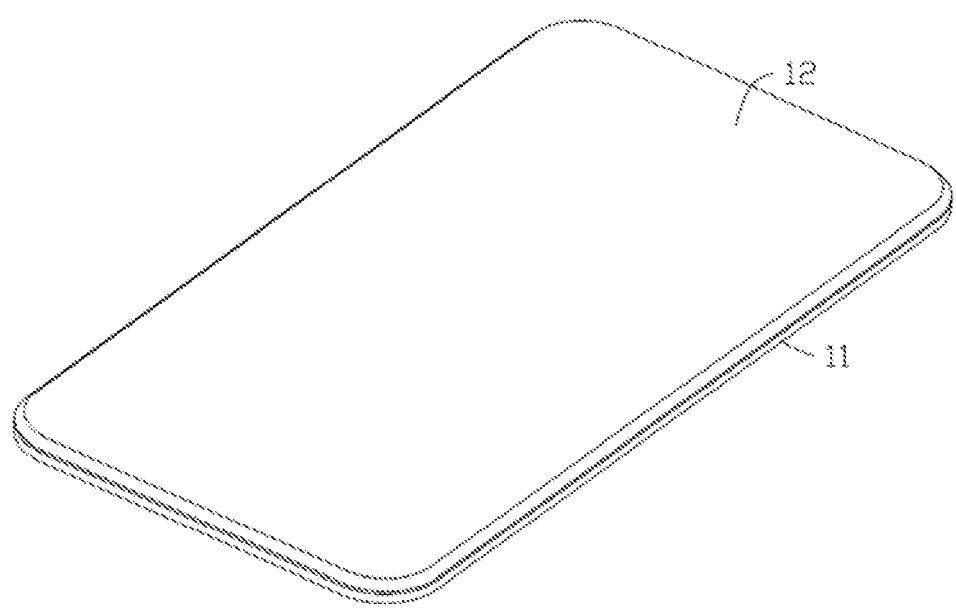
FIG. 2 is a diagrammatic view of a film attached to a flexible display screen of the electronic device of FIG. 1.

FIG. 2 illustrates the flexible display screen 11 and the film 12. The film 12 is arranged on the flexible display screen 11 and located under the flexible display screen 11. In the embodiment, the film 12 is attached to the flexible display screen 11. t, The backlight device 13 is arranged under the film 12 and can provide a light source for the flexible display screen 11.

Figure 3:
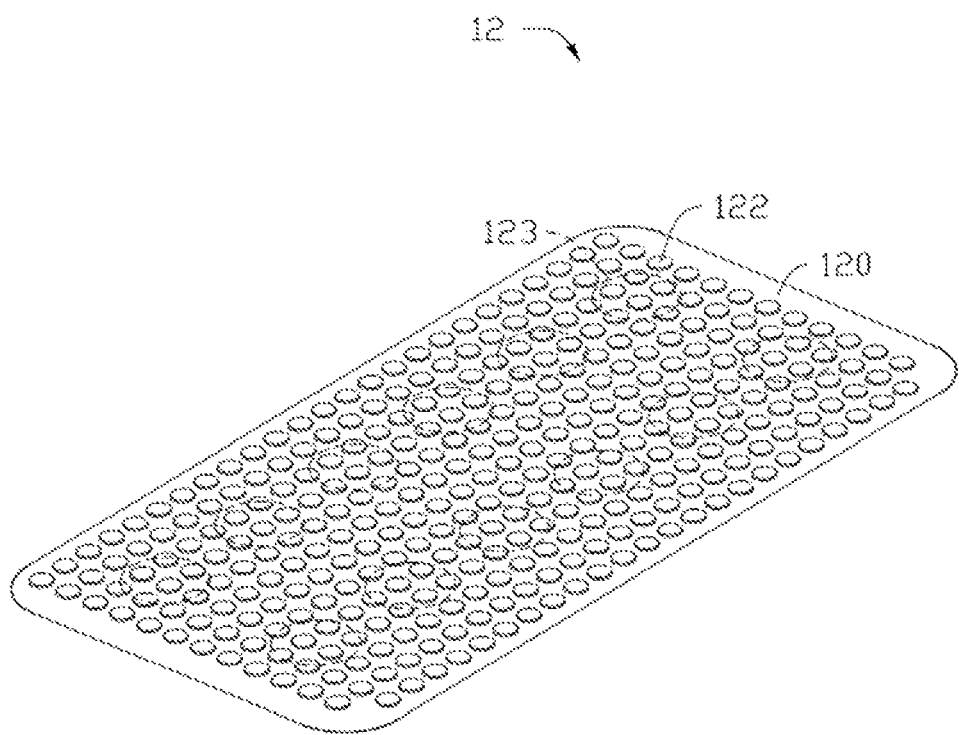
FIG. 3 is a side view showing the film of the electronic device of FIG. 1 in a first state.
Figure 4:
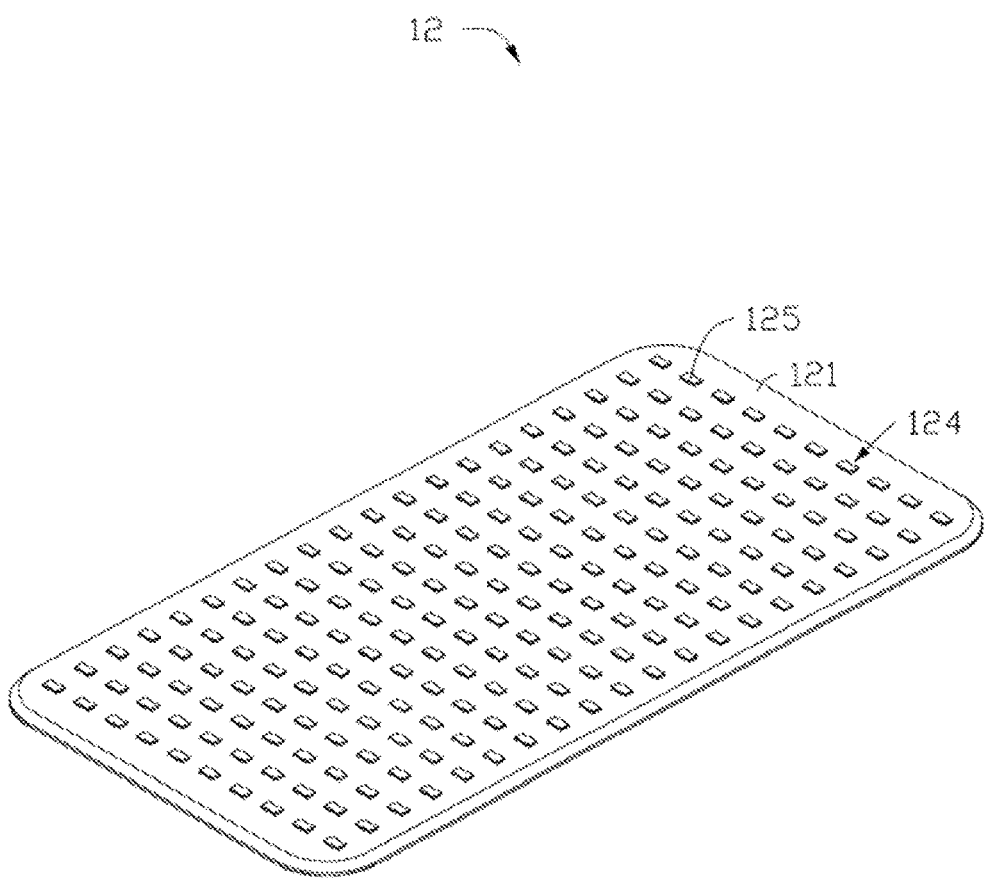
FIG. 4 is a side view showing the film of the electronic device of FIG. 1 in a second state.

FIG. 3 illustrates the film 12 in a first state. FIG. 4 illustrates the film 12 in a second state. The film 12 includes a front surface 120 and a back surface 121. The front surface 120 is opposite to the back surface 121. The front surface 120 faces the flexible display screen 11 and connects with the flexible display screen 11. The front surface 120 includes a number of projections 122. In the embodiment, the projections 122 are made of elastic materials. When the front surface 120 is heated, the projections 122 bulge out of the front substrate surface 120. The front surface 120 further includes one or more light detection units 123. The light detection units 123 are inlaid in the film 12. Each of the light detection units 123 can detect brightness value of a light beam under the flexible display screen 11 and transmit detected brightness value to the processor 14. In the embodiment, each of the light detection units 123 is a photoconductive resistance.

When an external contaminant such as dust particles is attracted to or pasted on the flexible display screen 11 and light from the backlight device 13 irradiates to the external contaminant, then the light is reflected back, and thereby a brightness value of the light under the contaminated flexible display screen 11 changes. In the embodiment, when the light from the backlight device 13 is reflected back by the external contaminant and the light detection unit 123 further detects the brightness value of the reflected light. In this condition, the detected brightness value includes a first brightness value of the light beam from the backlight device 13 and a second brightness value of the light beam reflected back by the external contaminant on the flexible display screen 11 (hereinafter "brightness value of the reflected light beam"). Therefore, the detected brightness value of the reflected light beam becomes greater than a brightness value of the unreflected light beam under the flexible display screen 11.

The back surface 121 is far away from the flexible display screen 11 and faces the backlight device 13. The back surface 121 further connects with the backlight device 13.

The film 12 further includes a heating circuit 124. The heating circuit 124 is embedded in the back surface 121. The heating circuit 124 includes a number of electrical resistance heater elements 125. Each of the electrical resistance heater elements 125 is located to correspond with a projection 122 and can generate heat to make the projections 122 bulge out from the front surface 120. The bulged projections 122 jack up or push out the flexible display screen 11, which makes the external contaminant slip down or fall from the flexible display screen 11. Thereby the flexible display screen 11 is cleaned up.

The processor 14 can receive the detected brightness value from the light detection unit 123. The processor 14 determines whether the detected brightness value equals a predefined brightness value. When the detected brightness value does not equal the predefined brightness value, the processor 14 determines that no external contaminant is present on an area of the flexible display screen 11 associated with the light detection unit 123. In the embodiment, the processor 14 determines whether the detected brightness value is greater than the predefined brightness value. When the detected brightness value is greater than the predefined brightness value, the processor 14 determines that an external contaminant is located in the flexible display screen 11. In this case, the processor 14 further controls the electrical resistance heater element 125 associated with the light detection unit 123 to generate heat, thus making the projections 122 push out the flexible display screen 11 and then making the external contaminant fall from the flexible display screen 11.

In an alternative embodiment, the processor 14 controls the flexible display screen 11 to be agitated and vibrate or shake up and down. When the external contaminant is determined to exist and be located in the flexible display screen 11, the processor 14 controls the flexible display screen 11 to shake up and down while the processor 14 controls the electrical resistance heater element 125 to generate heat.

In an embodiment, the predefined brightness value equals a brightness value of light under the flexible display screen 11 when the flexible display screen 11 has no external contaminant thereon.

Figure 5:
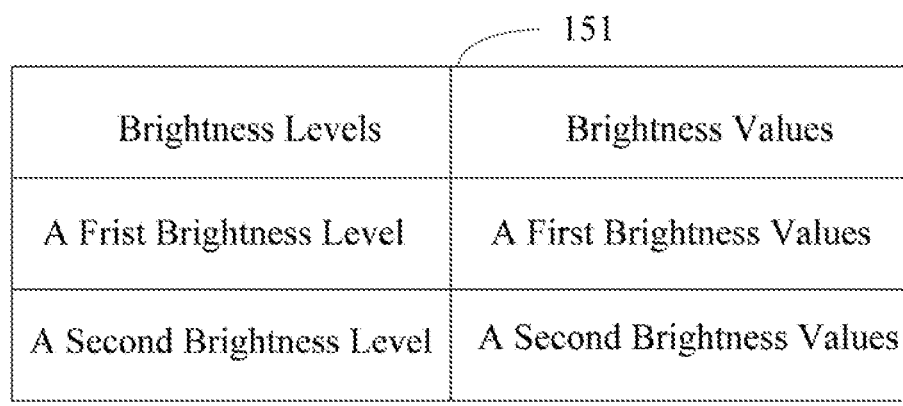
FIG. 5 is a diagrammatic view of a table stored in a storage device of the electronic device in FIG. 1 in accordance to an embodiment.

As shown in FIG. 1, the electronic device 1 includes a storage device 15. In the embodiment, the storage device 15 can be an internal storage system, such as a flash memory, a random access memory (RAM) for temporary storage of information, and/or a read-only memory (ROM) for permanent storage of information. The storage device 15 can also be an external storage system, such as a hard disk, a storage card, or a data storage medium. In the embodiment, the storage device 15 stores a table 151. As shown in FIG. 5, the table 151 records a number of brightness levels of the backlight device 13 and a number of predefined brightness values. Each predefined brightness value is associated with a brightness level. The processor 14 can determine a brightness level of the backlight device 13 and determine a predefined brightness value corresponding to the brightness level of the table. For example, when the brightness level of the backlight device 13 is determined to be at a first level, the processor 14 determines that the predefined brightness value associated with the first level is equal to a first brightness value.

In an alternative embodiment, the light detection unit 123 can detect the brightness value of ambient light passing through the flexible display screen 11. In the embodiment, when there is an external contaminant attached on the flexible display screen 11, the light from ambient light can be blocked by the external contaminant, and no or a reduced light beam passes through the flexible display screen 11 at the contaminated area. Therefore, the brightness value under the contaminated area of the flexible display screen 11 is lower than that of a clean area.

The processor 14 can receive the brightness value from the light detection unit 123 and determine whether the brightness value equals a predefined brightness value. The predefined value is the brightness value when the external contaminant is not attached to the flexible display screen 11. When the brightness value does not equal the predefined brightness value, the processor 14 determines that the external contaminant is attached to the flexible display screen 11 and controls the electrical resistance heater element 125 to heat up, thus causing the projections 122 to push out the flexible display screen 11 and making the external contaminant fall from the flexible display screen 11. In the embodiment, when the detected brightness value is less than the predefined brightness value, the processor 14 determines that the external contaminant is attached to the flexible display screen 11.

In the embodiment, the electronic device 1 includes a reminding device 16. The processor 14 can record a duration time when the detected brightness value from the detection unit 123 does not equal the predefined brightness value. When the duration time reaches a predefined time, the processor 14 can generate a reminding message to warn user of the electronic device 1 that the external contaminant has not been cleaned up and control the reminding device 16 to display the reminding message. In the embodiment, the reminding message is a voice message and the reminding device 16 is a speaker. In an alternative embodiment, the reminding device 16 is a lamp and the reminding message is a control signal for illuminating the reminding device 16.

The embodiments shown and described above are only examples. Even though numerous characteristics and advantages of the present technology have been set forth in the foregoing description, together with details of the structure and function of the present disclosure, the disclosure is illustrative only, and changes can be made in the detail, including in particular the matters of shape, size, and arrangement of parts within the principles of the present disclosure, up to and including the full extent established by the broad general meaning of the terms used in the claims.

What is claimed is:

1. An electronic device comprising:
   a flexible display screen;
   a processor; and
   a film attached to the flexible display screen and comprising a front surface and a back surface opposite to the front surface;
   the front surface facing the flexible display screen, comprising a plurality of heat-sensitive projections, and a plurality of light detection units inlaid in the film, each light detection unit detecting a brightness value of light under the flexible display screen and transmitting the detected brightness value to the processor, wherein each of the heat sensitive projections is made of elastic materials;
   the back surface being away from the flexible display screen, a heating circuit being embedded in the back surface; the heating circuit comprising a plurality of electrical resistance heater elements;
   wherein the processor receives the detected brightness value and determines whether the detected brightness value equals a predefined brightness value;
   when the detected brightness value does not equal the predefined brightness value, an external contaminant is thus determined to exist and be located on the flexible display screen, the processor further controls at least one electrical resistance heater element to generate heat, causing one of the plurality of projections to bulge out from the front surface, the bulging projection pushes out the flexible display screen, thus making the external contaminant fall from the flexible display screen.

2. The electronic device according to claim 1, wherein the processor further controls the flexible display screen to be agitated and vibrate when the detected brightness value does not equal to the predefined brightness value.

3. The electronic device according to claim 1, wherein the predefined brightness value equals a brightness value of a light beam under the flexible display screen when the flexible display screen has no external contaminant thereon.

4. The electronic device according to claim 1, further comprising a backlight device, wherein each light detection unit detects a brightness value of light from the backlight device irradiated to the flexible display screen and reflected back by the external contaminant existing and located on the flexible display screen.

5. The electronic device according to claim 1, further comprising a storage device for storing a table, wherein the table records brightness levels of the backlight device and predefined brightness values, each predefined brightness value is associated with a brightness level.

6. The electronic device according to claim 1, wherein each light detection unit detects a brightness value of light from ambient light when the ambient light passes through the flexible display screen.

7. The electronic device according to claim 1, further comprising a reminding device; wherein the processor records a duration time when the detected brightness value does not equal the predefined brightness value; when the duration time reaches a predefined time, the processor generates a reminding message to remind user of the electronic device that the external contaminant has not been cleaned up from the flexible display screen and controls the reminding device to display the reminding message.

8. The electronic device according to claim 1, wherein each light detection unit is a photoconductive resistance.

9. The electronic device according to claim 1, wherein the projections are made of elastic materials; the projections are bulged out of the front surface when the front surface is heated.

10. The electronic device according to claim 1, wherein the electronic device is a mobile device or a tablet computing device.

* * * * *